(12) United States Patent
Koma et al.

(10) Patent No.: US 6,927,825 B1
(45) Date of Patent: Aug. 9, 2005

(54) LIQUID CRYSTAL DISPLAY USING LIQUID CRYSTAL WITH BEND ALIGNMENT AND DRIVING METHOD THEREOF

(75) Inventors: Norio Koma, Gifu (JP); Tatsuo Uchida, Sendai (JP)

(73) Assignee: Sanyo Electric Co., Ltd. (JP)

( * ) Notice: Subject to any disclaimer, the term of this patent is extended or adjusted under 35 U.S.C. 154(b) by 0 days.

(21) Appl. No.: 09/568,897

(22) Filed: May 11, 2000

(30) Foreign Application Priority Data

| May 14, 1999 | (JP) | ............................................. | 11-134546 |
| May 14, 1999 | (JP) | ............................................. | 11-134547 |
| May 14, 1999 | (JP) | ............................................. | 11-134548 |

(51) Int. Cl.[7] ........................ G02F 1/1337; G02F 1/141; C09K 19/02

(52) U.S. Cl. ........................ 349/133; 349/123; 349/171; 349/177; 349/184; 349/186

(58) Field of Search ................................ 349/123, 133, 349/171, 177, 184, 186

(56) References Cited

U.S. PATENT DOCUMENTS

| 4,916,470 | A | * | 4/1990 | Kovacs et al. | ............... | 347/135 |
| 5,368,915 | A | * | 11/1994 | Ueda | .......................... | 428/209 |
| 5,369,261 | A | * | 11/1994 | Shamir | ....................... | 235/469 |
| 5,825,445 | A | * | 10/1998 | Okamoto et al. | ........... | 349/118 |
| 6,005,646 | A | * | 12/1999 | Nakamura et al. | .......... | 349/133 |
| 6,195,147 | B1 | * | 2/2001 | Asao et al. | ................... | 349/133 |
| 6,221,444 | B1 | * | 4/2001 | Okada et al. | ............... | 428/1.25 |
| 6,542,211 | B1 | * | 4/2003 | Okada et al. | ................ | 349/130 |

FOREIGN PATENT DOCUMENTS

| EP | 0536680 A2 | * | 4/1993 |
| EP | 0854465 A1 | * | 3/1998 |
| JP | HEI 7-84254 | | 3/1995 |
| JP | HEI 8-87013 | | 4/1996 |
| JP | HEI 11-14988 | | 1/1999 |

OTHER PUBLICATIONS

Tetsuy Miyashita and Tatsuo Uchida, "Optically Compensated Bend Mode (OCB Mode) with Wide Viewing Angle and Fast Response." IEICE Transactions on Electronics, vol. E79–C, No. 8, Aug. 1996, pp. 1076–1082.
Tatsuo Uchida and Tetsuya Miyashita, "OCB–Mode Display", Display and Imaging 1996, vol. 5, pp. 35–42.
T. Miyashita, P. Vetter, M. Suzuki, Y. Yamaguchi and T. Uchida, "Wide Viewing Angle Display Mode for Active Matrix LCD Using Bend Alignment Liquid Crystal Cell", Int. Display Res. Conf. Eurodisplay 1993, pp. 149–152.
Y. Yamaguchi, T. Miyashita, and T. Uchida, "19.4: Late–News Paper: Wide–Viewing–Angle Display Mode for the Active–Matrix LCD Using Bend–Alignment Liquid–Crystal Cell.", SID 93 Digest, pp. 277–280.
Philip J. Bos, Philip A. Johnson, Jr. and K. Rickey Koehler/Beran, "6.2/11:25 a.m.: A Liquid–Crystal Optical–Switching Device (π Cell)." SID 83 Digest, pp. 30–31.
Tetsuya Miyashita and Tatsuo Uchida. "Widening Viewing Angle of a TFT: OCB Mode Achieving Quick Response, Stabilizing Alignment is the Key." Flat Panel Display 1994, (Published on Dec. 10, 1993 by Nikkei Business Publications, Inc.) pp. 170.
Tatsuo Uchida. Widening Viewing Angle: Development of Cell Technique Simultaneously Achieving Wide Viewing Angle and Quick Response. Flat Panel Display 1995, (published in 1994 by Nikkei Business Publications, Inc.) pp. 150–154.

* cited by examiner

Primary Examiner—Tarifur R. Chowdhury
Assistant Examiner—Hoan Chau Nguyen
(74) Attorney, Agent, or Firm—Cantor Colburn LLP

(57) ABSTRACT

When a transition voltage, which is higher than a display voltage for image display, is applied to liquid crystal, the liquid crystal can transition to a bend alignment. Therefore, by applying a transition voltage to liquid crystal prior to image display period only for a transition time which depends on a transition voltage so as to cause a bend transition in the liquid crystal, an OCB mode LCD with a high speed response can be obtained. An interval d between pixel regions is set to be less than, for example, a transition distance of 5 μm, so that a bend transition expands over inter-pixel regions to thereby achieve a bend transition all over the display region. In an active matrix type LCD, a electrical field is caused to be generated between a common electrode and data lines or gate lines disposed between pixel electrodes due to application of a transition voltage to the common electrode, thereby obtaining a bent transition over the entire surface of the display screen. Further, a pretilt angle set by an alignment film is determined to be 1.2° or more, such that a great number of transition sources for causing a bend transition are generated to thereby secure a high speed bend transition. Also, the pretilt angle is set to be 3° or less for accelerating a response time in a bend alignment.

44 Claims, 13 Drawing Sheets

OVERLAPPING REGION

LIQUID CRYSTAL DISPLAY USING LIQUID CRYSTAL WITH BEND ALIGNMENT AND DRIVING METHOD THEREOF

BACKGROUND OF THE INVENTION

1. Field of the Invention

The present invention relates to a liquid crystal display (LCD), and in particular to an OCB (Optically Compensated Birefringence) mode LCD in which liquid crystal is driven at high speed.

2. Description of Related Art

LCDs with a faster response time have been in demand so as to enhance motion reproducibility of LCDs and to achieve practical application of field sequential LCDs (FS-LCDs).

A response time of an LCD refers to the time required for changing a state of liquid crystal to a drive state after a drive voltage is applied thereto. Specifically, when a voltage is applied to liquid crystal, liquid crystal molecules are aligned in a designed orientation to place the liquid crystal in a drive state. A certain amount of time is required for the alignment of liquid crystal to complete, and this time is referred to as the response time. An LCD with a slow response time has particularly poor motion display characteristics, because a prior image remains displayed for some time when displaying a motion image. Accordingly, use of an LCD employing liquid crystal with a faster response time can smooth motion image display.

In FS-LCDs, light of three primary colors are rapidly switched to alternately display images with respective colors in a single pixel, thereby achieving color display. Liquid crystal used in FS-LCDs demands a response time which is significantly faster than that used in color filter type LCDs due to the operation principle, and a practical application of FS-LCDs is highly expected.

An OCB mode liquid crystal display has been known to have a high speed response. OCB mode LCDs employ liquid crystal having a bent alignment together with a biaxial optically compensating layer. Referring to FIGS. 1A to 1C, an LCD comprises transparent substrates 51, 52 made of glass or the like and opposing each other, first and second electrodes 53, 54 and alignment films 55, 56 sequentially formed on the respective substrates, and a liquid crystal layer 57 disposed between the alignment films. The liquid crystal layer 57 comprises nematic liquid crystal. The alignment films 55, 56 are subjected to a rubbing treatment in directions substantially in parallel to each other, such that liquid crystal molecules in the liquid crystal layer 57 are oriented at a pretilt angle so as to face each other. Optically compensating layers (not shown) are disposed on the respective alignment films to achieve visible display. FIG. 1A shows an LCD when no voltage is applied to the electrodes 53, 54, in which liquid crystal molecules 57a are orientated in the rubbing direction (in the direction parallel to a document surface) while liquid crystal molecules adjacent to the alignment films 55, 56 are oriented at a pretilt angle. Referring to FIG. 1B, a drive voltage of 5V, for example, is applied to the electrode 53, and the liquid crystal molecules rise due to the applied voltage whereas molecules in the center of the liquid crystal layer 57 remain falling. A state of alignment as shown in FIG. 1B is referred to as a splay alignment. Referring to FIG. 1C, the alignment of the liquid crystal is changed to a bent alignment in which, unlike the bend alignment, the liquid crystal molecules in the center of the liquid crystal layer 57 also rise. The splay alignment and the bend alignment are reversible phase transitions. A transition of liquid crystal from a splay alignment to a bend alignment is referred to as a "bend transition".

An OCB mode LCD is one example of an LCD using a bend alignment, in which liquid crystal with a bend alignment and a biaxial optical compensating layer are employed. Therefore, an OCB mode LCD is suitable for motion display or FS-LCDs, because liquid crystal with a bend alignment has a faster response than liquid crystal used in TN type or STN type LCDs.

There is, however, a problem that the response time significantly differs between the splay alignment before a bend transition and the bend alignment. Therefore, when producing an LCD which employs an OCB mode, a bend transition of the liquid crystal within LCD cells should be secured.

Most of the physical mechanism of a bend transition remains unknown and at present there are many problems remaining to be solved.

SUMMARY OF THE INVENTION

The present invention therefore aims to provide an OCB mode LCD having a fast response time, in which a bend transition of liquid crystal is secured.

In order to achieve the above object, the present invention has the following features.

According to one aspect, the present invention relates to a method of achieving a transition in an alignment state of liquid crystal, wherein liquid crystal, provided between first and second alignment films disposed to face each other and covering first and second electrodes, has a splay alignment state and a bend alignment state; the splay alignment state energy level crosses the bend alignment state energy level when a voltage applied between the first and second electrodes reaches a prescribed threshold voltage; and a voltage higher than said threshold voltage and higher than a maximum in a a range of voltages for driving the liquid crystal is applied to said liquid crystal through said first and second electrodes, to thereby achieve a transition to said bend alignment state in said liquid crystal.

The present invention also relates to a method of driving a liquid crystal display device, characterized in that a transition voltage higher than a maximum in a range of applied display voltages is applied to said liquid crystal through first and second electrodes disposed with liquid crystal interposed therebetween, so that said liquid crystal achieves a transition to said bend alignment state, to thereby drive the liquid crystal in the bend alignment state and present a display.

According to another aspect of the present invention, in the above method of driving a liquid crystal display device, the splay alignment state energy level crosses the bend alignment state energy level when a voltage applied between the first and second electrodes reaches a prescribed threshold voltage.

According to still another aspect of the present invention, in the above liquid crystal display devices or in the methods of driving the liquid crystal display device, the state energy level of said liquid crystal in said bend alignment state becomes lower than that of said liquid crystal in said splay alignment state when the voltage applied to said liquid crystal through the first and second electrodes reaches or exceeds a prescribed threshold voltage.

According to a further aspect of the present invention, in the above liquid crystal display devices or in the methods of driving the liquid crystal display device, a display voltage is applied between said first and second electrodes to drive said liquid crystal and present a display in accordance with said display voltage, and said transition voltage higher than said display voltage is applied before applying said display voltage.

In this manner, a transition voltage is applied to liquid crystal prior to a shift to a display mode so that the liquid crystal can transition to a bend alignment state before entering a display mode. Because a display voltage is higher than said threshold voltage, the liquid crystal remains in the bend alignment state with a lower state energy during a normal display mode when a display voltage is applied. An LCD in a bend alignment state can provide a high speed response to an applied voltage as well as preferable display with a wide viewing angle, which results in image display at an optimum status.

According to a further aspect of the present invention, in the above methods of driving the liquid crystal display device, said display voltage is higher than said threshold voltage.

According to a still further aspect of the present invention, in the above methods of driving the liquid crystal display device, said transition voltage is continuously applied between said first and second electrodes during a prescribed transition period determined in accordance with the value of said transition voltage.

With a display voltage which is higher than the threshold voltage, it is possible to drive the liquid crystal in accordance with a content to be displayed, while retaining the liquid crystal in a bend alignment state which is capable of high speed response during the display period.

Further, the length of a transition time can be appropriately determined in accordance with a transition voltage, such that the liquid crystal can transition to a bend alignment with a minimum power. Also, an effective bend transition can be performed by continuous application of a transition voltage during the transition time.

According to a further aspect of the present invention, in the above liquid crystal display devices or in the methods of driving the liquid crystal display device, said first electrode is composed of a plurality of pixel electrodes formed corresponding to a plurality of pixels, said second electrode is formed as a common electrode facing said plurality of pixel electrodes, and said transition voltage is applied to said liquid crystal by making a potential difference between said first substrate and said common electrode greater than a potential difference between said first substrate and said plurality of pixel electrodes.

As described, a potential difference between the common electrode formed to extend over the whole region of the second substrate and the first substrate is increased so as to cause a transition voltage to be substantially applied to the common electrode, such that the liquid crystal, when being provided with said transition voltage, can transition to a bend alignment state even if the transition voltage is not very high. In particular, the transition voltage can also be applied to inter-pixel regions where no pixel electrodes exist by the common electrode, so that the liquid crystal can immediately transition to the bend alignment state over the whole regions of display cells.

According to yet a further aspect, the present invention relates to a liquid crystal display device including liquid crystal between first and second substrates, comprising a plurality of first electrodes formed on a side of said first substrate facing said second substrate; a first alignment film formed to cover said plurality of first electrodes; a second electrode formed on a side of said second substrate facing said first substrate; and a second alignment film formed to cover said second electrode. Said liquid crystal is provided between said first and second alignment films, and has a splay alignment state and a bend alignment state, and the interval between adjacent electrodes among said plurality of first electrodes, or the width of a region where a conductive layer is not present located between adjacent electrodes among said plurality of first electrodes, is 5 $\mu$m or less.

According to a further aspect of the present invention, in the above liquid crystal display device, the interval between adjacent electrodes among said plurality of first electrodes, or the width of a region where a conductive layer is not present located between adjacent electrodes among said plurality of first electrodes, is 2 $\mu$m or less.

According to a still further aspect of the present invention, in the above liquid crystal display devices, the first electrode is formed by a plurality of stripe-type electrodes, the second electrode is formed by a plurality of stripe-type electrodes disposed in a direction substantially perpendicular to said first electrodes, and the interval between adjacent electrodes among said plurality of first stripe-type electrodes, and/or the interval between adjacent electrodes among said plurality of second stripe-type electrodes, is 5 $\mu$m or less, or 2 $\mu$m or less.

In a liquid crystal display comprising the first and second electrodes as described above, when an interval between the plurality of first electrodes, or an interval between the plurality of second electrode is set to be 5 $\mu$m or less or 2 $\mu$m or less, regions where no electrodes exist, namely inter-pixel regions, do not form a barrier against a bend transition, even in a passive matrix type LCD. Therefore, the liquid crystal can immediately transition from a splay alignment to a bend alignment over the entire region of the display cells.

According to a further aspect, the present invention relates to a liquid crystal display device including liquid crystal between first and second substrates, comprising a plurality of pixel electrodes formed on a side of said first substrate facing said second substrate; a first alignment film formed to cover said plurality of pixel electrodes; a common electrode formed on a side of said second substrate facing said first substrate; and a second alignment film formed to cover said common electrode. Said liquid crystal is provided between said first and second alignment films, and has a splay alignment state and a bend alignment state. The interval between adjacent electrodes among said plurality of pixel electrodes, or the width of a region where a conductive layer is not present located between adjacent electrodes among said plurality of pixel electrodes, is 5 $\mu$m or less.

According to a further aspect of the present invention, in the above liquid crystal display devices, the width of a region where a conductive layer is not present located between adjacent electrodes among said plurality of pixel electrodes is 2 $\mu$m or less.

According to a further aspect of the present invention, the above liquid crystal display devices further comprise an inter-pixel electrode disposed at the interval between adjacent electrodes among said plurality of pixel electrodes, wherein the distance between said inter-pixel electrode and the corresponding electrode among said plurality of pixel electrodes is 2 $\mu$m or less.

According to a further aspect of the present invention, in the above liquid crystal display devices, said plurality of pixel electrodes are insulated from said inter-pixel electrode.

According to a further aspect of the present invention, the above liquid crystal display devices further comprise an inter-pixel electrode disposed at the interval between adjacent electrodes of said plurality of pixel electrodes, wherein said inter-pixel electrode and the corresponding electrode among said plurality of pixel electrodes have an overlapping region with an insulating layer interposed therebetween.

According to a still further aspect of the present invention, in the above liquid crystal display device, a switching element is connected to each of said plurality of pixel electrodes, and a selection line for selecting said switching element or a signal line for supplying a prescribed signal to each of said plurality of pixel electrodes is provided as an inter-pixel electrode at the interval between adjacent electrodes among said plurality of pixel electrodes.

As described above, when a distance in the direction of a plane between a plurality of pixel electrodes formed as discrete electrodes, or a distance between selection lines (for example, gate lines) or signal lines (for example, date lines or auxiliary capacitor lines) disposed in inter-pixel regions and the pixel electrodes is set to be 5 µm or less, or 2 µm or less, the liquid crystal can rapidly transition from the splay alignment to the bend alignment over the entire region of the display cells without forming any barriers between the pixel electrodes. In an active matrix type LCD in which various lines are usually disposed between the pixel electrodes, use of these conductive lines eliminates a need for providing extra conductive layers between the pixel electrodes for transitioning the liquid crystal to a bend alignment.

According to a further aspect, the present invention relates to a liquid crystal display device including liquid crystal between first and second substrates, comprising a first electrode formed on a side of said first substrate facing said second substrate; a first alignment film formed to cover said first electrode; a second electrode formed on a side of said second substrate facing said first substrate; and a second alignment film formed to cover said second electrode. Said liquid crystal is provided between said first and second alignment films, and has a splay alignment state and a bend alignment state. A pretilt angle determined by said first and second alignment films is greater than 1.2°, but not greater than 3.0°.

With a pretilt angle of 1.2° or more, the liquid crystal can provide still faster rising response to an applied voltage in the bend alignment state, which is very advantageous in applications demanding high speed drive.

Further, with a pretilt angle of 1.2° or more, a faster transition speed from a splay alignment state to a bend alignment state (a faster expansion speed for a bend transition) can be obtained with the same transition voltage being applied. Accordingly, it is possible to rapidly transition the liquid crystal from the splay alignment to the bend alignment in which a desired high speed response can be obtained, prior to application of a display voltage in accordance with an image to be displayed between the first and second electrodes, for example. This can, for example, reduce a starting time for enabling a display state of an LCD after power is turned on.

Further, with a pretilt angle of 3° or less, a rising response time as well as a falling response time of the liquid crystal which has once transitioned to a bend alignment is sufficiently fast for applications demanding a high speed operation, such as FS-LCDs.

BRIEF DESCRIPTION OF THE DRAWINGS

These and other objects of the invention will be explained in the description below, in connection with the accompanying drawings, in which.

DETAILED DESCRIPTION OF THE PREFERRED EMBODIMENTS

Preferred embodiments of the present invention will be described in further detail with reference to the accompanying drawings.

Figure 2:
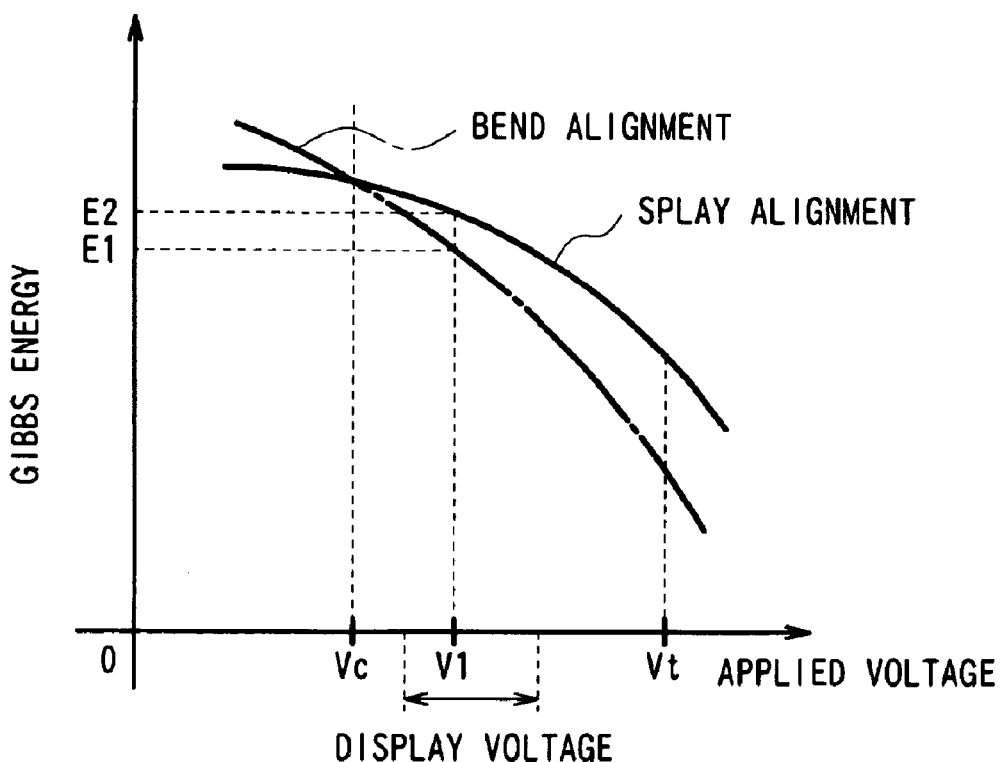
FIG. 2 is a graph depicting Gibbs energy in liquid crystal in a bend alignment state and a splay alignment state.
Figure 3:
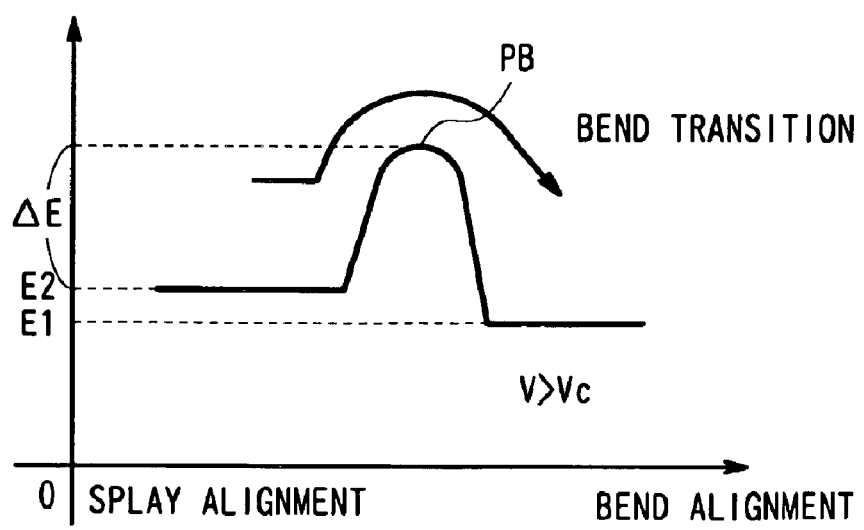
FIG. 3 is a graph depicting a potential barrier between a bend alignment and a splay alignment.

FIG. 2 shows a change in Gibbs energy with respect to a voltage applied to liquid crystal for explaining a fundamental principle of a transition according to the present invention, in which Gibbs energies of liquid crystal in a splay alignment state and a bend alignment state are indicated by a solid line and a dotted line, respectively. FIG. 3 shows Gibbs energy of the splay and bend alignment states when a voltage of V1 which is higher than a threshold voltage Vc is applied.

Gibbs energy is state energy which varies depending on the alignment state of liquid crystal. The lower the state energy, more stable is the liquid crystal. As an applied voltage increases, the energy decreases both in the splay and bend alignment states. Namely, liquid crystal which has been stable in the pretilt orientation when no voltage applied is driven by application of a voltage to assume either a splay alignment or a bend alignment. Gibbs energy is lower in the splay alignment state when an applied voltage is lower than the threshold voltage Vc and whereas it is lower in a bend alignment state when an applied voltage is over Vc. According to the nature of substances that lower the state energy, the more stable a substance, the greater the stability of a splay alignment over a bend alignment when an applied voltage is under Vc, placing the liquid crystal in a splay alignments state, which is an initial alignment state of the liquid crystal. On the other hand, when an applied voltage exceeds Vc, a bend alignment becomes more stable.

In an OCB mode LCD using liquid crystal with a bend alignment, however, a transition to a bend alignment (i.e. bend transition) is unlikely to occur, even when an applied voltage is simply increased to V1, for example, which is higher than the threshold voltage Vc, due to a potential barrier PB between a splay alignment and a bend alignment as shown in FIG. 3. Namely, V1 is not sufficient for exceeding the potential barrier PB of ΔE, failing to perform a bend transition. Once a bend transition is performed with a voltage exceeding the potential barrier PB, the liquid crystal remains in a bend alignment with lower Gibbs energy as long as an applied voltage is over Vc.

Referring to FIG. 2, as an applied voltage increases beyond V1, a difference in Gibbs energy between a bend alignment state and a splay alignment state further increases, with the Gibbs energy level of a bend alignment being lower. Therefore, according to the present invention, prior to display on an LCD, a transition voltage which is sufficiently higher than the threshold voltage Vc is previously applied to the liquid crystal so as to cause a bend transition to occur in the liquid crystal within the liquid crystal cells.

Figure 1A:
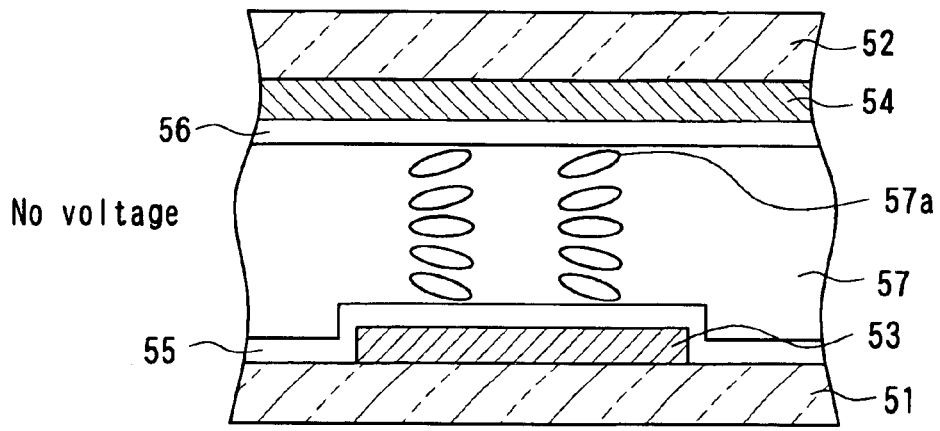
FIGS. 1A, 1B, and 1C are cross sections for explaining a bend alignment and a splay alignment of liquid crystal.
Figure 1B:
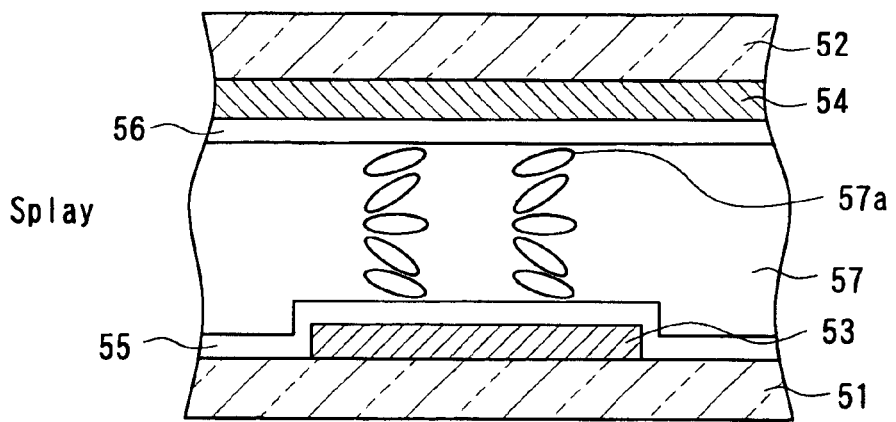
Figure 1C:
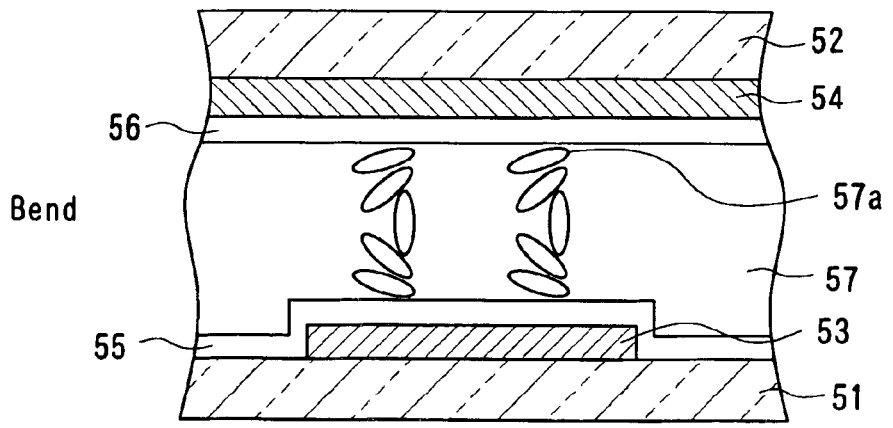
Figure 4:
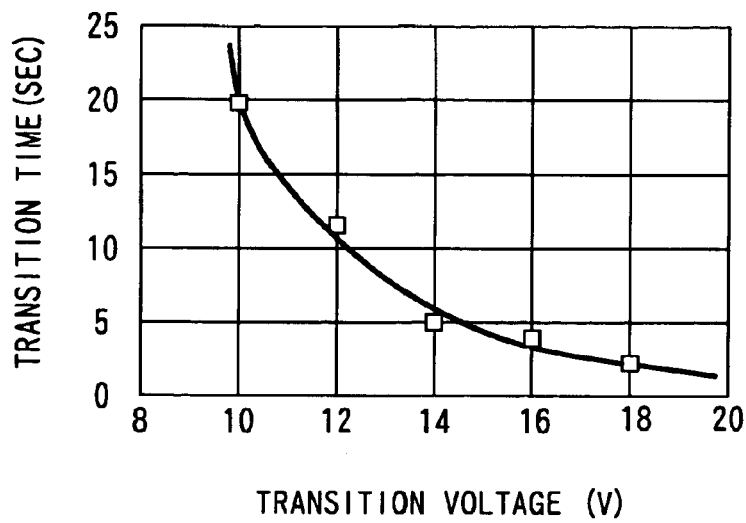
FIG. 4 is a graph showing a relationship between a transition voltage and a transition time required for a bend transition of liquid crystal.
Figure 5:
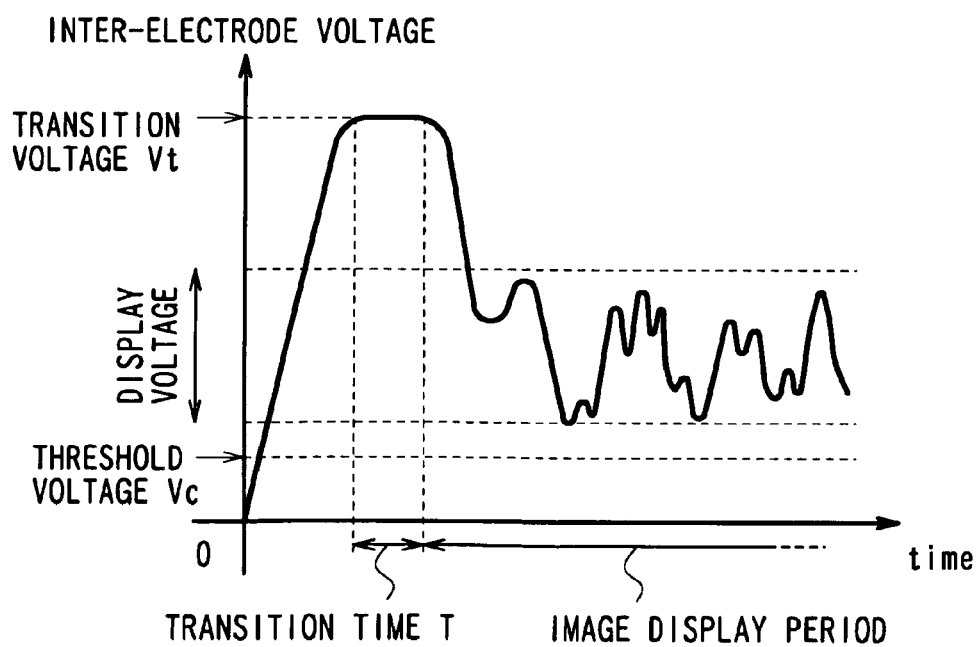
FIG. 5 is a graph showing an inter-electrode voltage for an liquid crystal display according to an embodiment of the present invention.

An LCD according to the first embodiment of the present invention has a schematic sectional structure which is similar to the LCD shown in FIGS. 1A to 1C. More specifically, such an LCD comprises transparent substrates 51, 52 opposing each other, first and second electrodes 53, 54 and alignment films 55, 56 sequentially formed on the respective substrates, and a liquid crystal layer 57 disposed between the alignment films. FIG. 4 shows experimental values obtained by measuring the time period required for a bend transition in the liquid crystal existing between the first electrode 53 and the second electrode 54 while a fixed voltage is continuously applied between these electrodes. When a voltage of 10V was continuously applied between these electrodes 53, 54, a bend transition was achieved in approximately 20 seconds. With an increase in an applied voltage, the time required for bend transition was suddenly shortened, for example to 2 seconds when a voltage of 18V was applied. Thus, it can be concluded that, by applying a voltage which is sufficiently higher than the threshold voltage Vc (which will hereinafter be referred to as "a transition voltage"), a bend transition can be performed in liquid crystal so that an LCD can operate in an OCB mode.

The above effect is possible because, as applied voltage is increased, the energy difference between the bend and splay alignment states is increased, as is the number of liquid crystal molecules having energy sufficient for exceeding the potential barrier PB.

Liquid crystal which has transitioned to the bend alignment does not revert to a splay alignment state unless an applied voltage is sufficiently lower than Vc, because a potential barrier PB also exists when transiting to a splay alignment as clearly shown in FIG. 3. Accordingly, liquid crystal which has achieved a bend transition can remain in the bend alignment state such that an LCD can operate in an OCB mode, as long as a display voltage which is not greatly below Vc is applied to obtain image display. An experiment performed by the present inventors confirmed that an LCD which has achieved a bend transition retained an OCB mode for about several hours even after a voltage of 0V was applied.

Embodiment 1

Specifically, if a transition voltage is once applied when an LCD is powered on, for example, to cause a bend transition in liquid crystal, the bend alignment state is maintained while a display voltage is applied (namely, while image display is performed). Therefore, in an LCD according to this embodiment using an OCB mode, a transition voltage Vt is first applied between the first and second electrodes for a transition time T when the LCD is powered on (time=0), and thereafter a display voltage in accordance with the waveform of a video signal is applied to perform image display, as in prior art LCDs. The transition voltage Vt and the transition time T may be determined based on FIG. 4, for example.

In order to secure a bend transition of liquid crystal, the values of a transition voltage Vt and a transition time T are determined by selecting, among the values for Vt and T plotted on a chart of FIG. 4, those existing in a region above the solid line. However, a long transition time T results in a long waiting time for screen display to start, during which an applied voltage is high and a power consumption is increased. Further, a high transition voltage Vc also increases a power consumption and requires a power source with a large capacity. Therefore, it is preferable to select a transition voltage Vt and a transition time T in the vicinity of the solid line. If a transition voltage Vt is set to be 15V, for example, a transition time T is as short as 5 seconds. Also, when an LCD is used in a monitor of a personal computer, for example, it is preferable to set a transition time T to a high value, such as 15 seconds, while a transition voltage is set to a small value such as 11V, since the necessity of viewing a screen is low while actuating an OS (operation system) in the waiting time. It is possible to perform a bent transition even with a transition voltage Vt and a transition time T existing in a region under the solid line in FIG. 4, as long as they are in the vicinity of the solid line and are not far below the solid line.

Although it is expected that a higher voltage applied results in a faster bend transition, a voltage greater than a withstanding voltage between the first and second electrode 53, 54 can not be applied because of the fine structure of LCDs. Further, application of a high voltage requires a corresponding power source, which leads to an upsize of a device when an LCD is used in a monitor of a portable terminal, for example. Accordingly, application of a voltage greater than 20V is not practical while a transition time of at least 1 second should be secured.

Figure 6A:
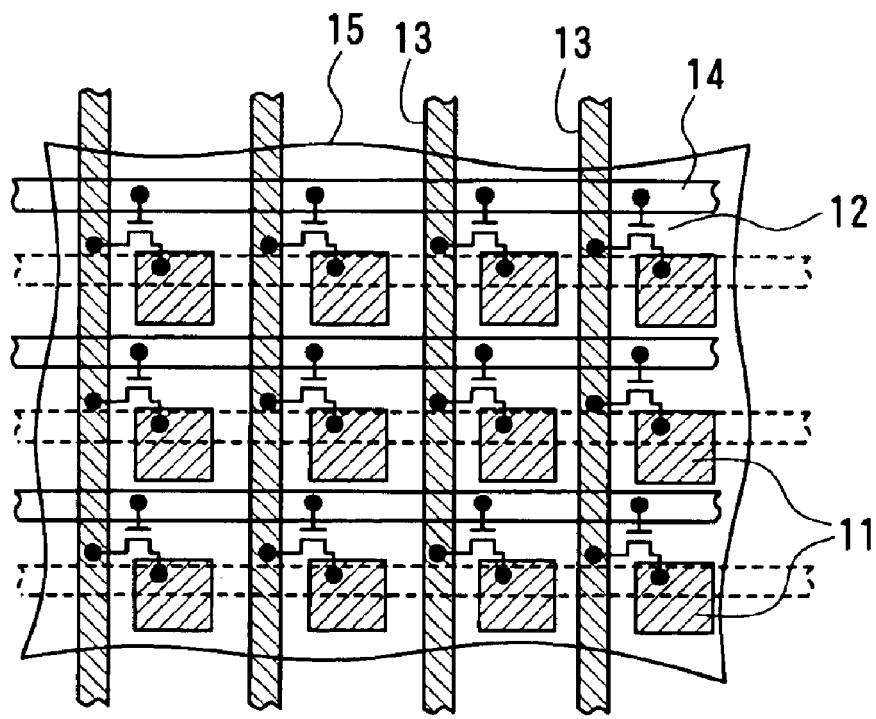
FIG. 6A is a plan view showing a schematic structure of an active matrix type LCD.

FIG. 6A is a plan view showing an active matrix type LCD, in which pixel electrodes 11 are provided for respective pixels, and each pixel electrode 11 is connected to a data line 13 via a thin film transistor 12. A gate electrode in each thin film transistor 12 is connected to a gate line 14 which is formed to be insulated from the data line 13. Auxiliary capacitor electrodes shown by dotted lines may also be provided. All of the above elements are formed on a first substrate, and a common electrode 15 covering all these elements is formed on a second substrate.

In order to cause the liquid crystal thus configured to transition to a bend alignment, a transition voltage is applied between a first electrode, namely the pixel electrode 11, and a second electrode, namely the common electrode 15. It is possible to apply a transition voltage by making one of the electrodes grounded while increasing or decreasing a potential of the other electrode. However, a region in pixel cells to which a voltage is not applied is difficult to transition to a bend alignment, because, as already described with respect to FIG. 2, Gibbs energy is lower in a splay alignment state when an applied voltage is under an inversion voltage (threshold voltage) Vc. As a result, when the common electrode 15 is grounded while a transition voltage is applied only to the pixel electrodes 11 on the first substrate, a bend transition may not be performed in gap regions between the pixel electrodes 11. In order to deal with this, it is necessary to apply a transition voltage to all the electrodes formed on the first substrate, including the pixel electrodes 11, the thin film transistors 12, the data lines 13, the gate lines 14, the auxiliary capacitor electrodes or the like. However, although not impossible, such a solution complicates lines for applying a transition voltage and may lead to breakdown of the thin film transistors 12 due to application of a high voltage of 20V, being as high as a gate voltage, to the gate electrodes. Accordingly, when a transition voltage is applied to an active matrix type LCD, it is preferable that each electrode disposed on the first substrate is set to have the same potential as that of the first substrate, namely is grounded, while a transition voltage is applied to the common electrode 15. A potential of the common electrode 15 which covers all the electrodes on the first substrate is varied such that a transition voltage can be easily applied to all the region of the liquid crystal. Since the first substrate is usually grounded, a potential difference between the first substrate and the common electrode is larger than a potential difference between the first electrode and the pixel electrode 11 at the time of application of a transition voltage.

Figure 6B:
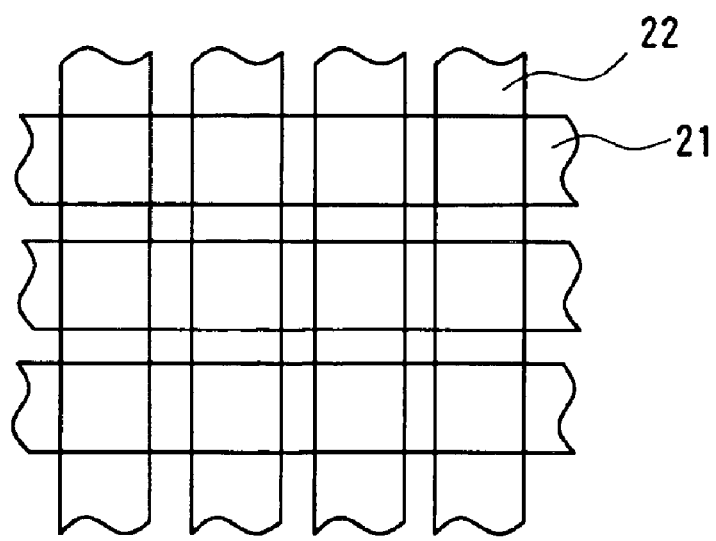
FIG. 6B is a plan view showing a schematic structure of a passive matrix type LCD.

In a passive matrix type LCD shown in FIG. 6B, on the other hand, a first electrode 21 and a second electrode 22 are equivalent and therefore a transition voltage may be applied to either of the electrodes. Alternatively, a voltage of an opposite polarity may be applied to each of the first and second electrodes 21, 22 to together constitute a transition voltage.

Thus, this embodiment is similarly applicable in any types of liquid crystal displays (LCDs) including a passive or active matrix type, transmission type, reflection type, and others.

According to this embodiment, as described above, a transition voltage which is higher than a display voltage is applied between the first and second electrodes prior to application of the display voltage, such that the liquid crystal can previously transition to a bend alignment before performing image display. During a screen display period, the liquid crystal can be operated in a display mode with a bend alignment state which enables high speed response, namely in an OCB mode.

Since a transition voltage is continuously applied during a transition time period which is determined in accordance with the applied transition voltage, a bend transition can be secured. Further, it is possible to transition liquid crystal to a bend alignment in a practical time while applying a minimal transition voltage.

In an active matrix type LCD, as described above, a transition voltage is applied to a common electrode, such that a line for applying a transition voltage is simplified and a bend transition can be obtained even in regions over which no pixel electrodes are formed.

Embodiment 2

Figure 7A:
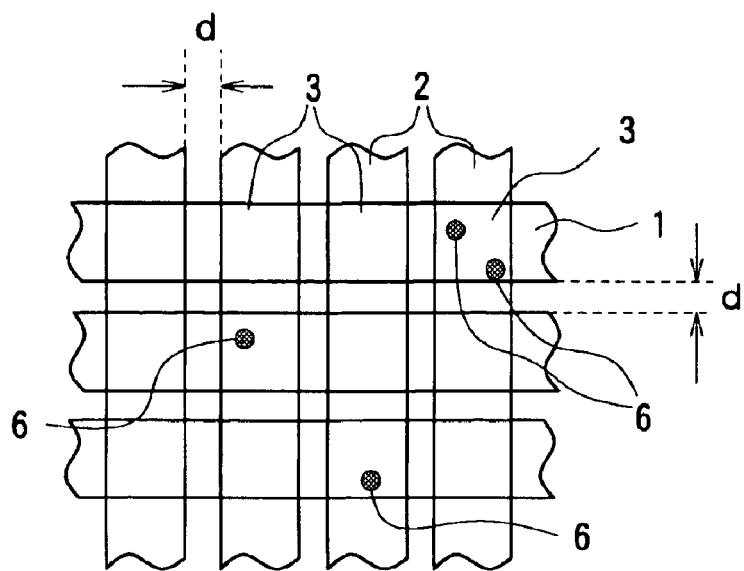
FIGS. 7A, 7B and 7C are plan views showing how a bend transition expands in a passive matrix type LCD.
Figure 7B:
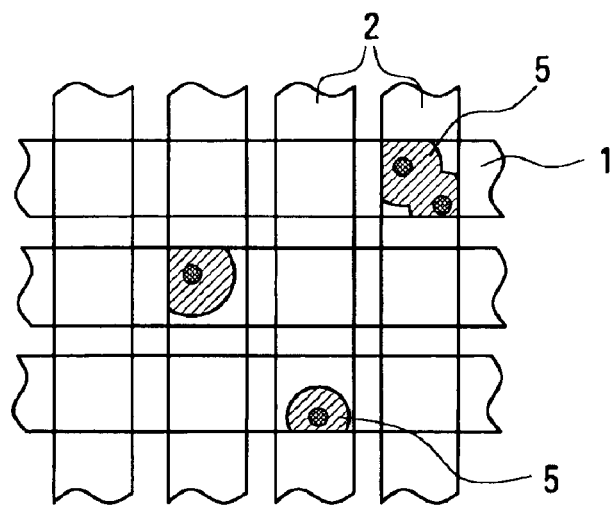
Figure 7C:
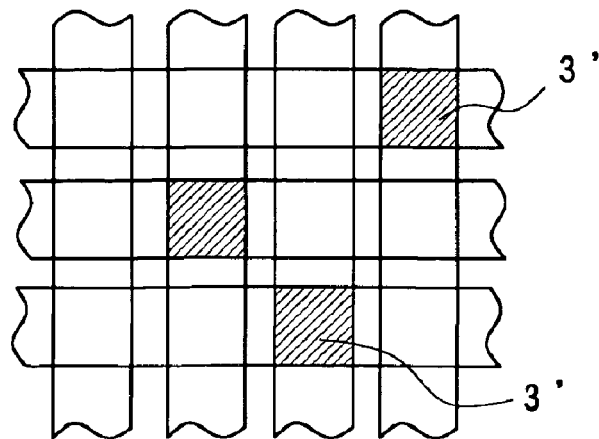

A relationship between a bend transition and a distance between electrodes (an inter-electrode distance) in a passive matrix type LCD will now be described. FIGS. 7A to 7C are plan views depicting a transition from a splay alignment to a bend alignment in a passive matrix type LCD. The LCD comprises first and second transparent substrates facing each other which are made of glass, and liquid crystal interposed between the cell of these electrodes. A plurality of first electrodes 1 are formed on a surface of the first transparent substrate facing the second substrate so as to extend in the horizontal direction in a stripe shape. A plurality of second electrodes 2 are formed on a surface of the second transparent substrate facing the first substrate so as to extend in the vertical direction in a stripe shape. Regions where the first and second electrodes overlap with each other via liquid crystal form respective pixel regions 3, in which an electrical field is generated by a voltage applied between the first and second electrodes to drive the liquid crystal.

Referring first to FIG. 7A, each of several points shown within the cells by cross hatched lines is a transition factor (transition source) which triggers a bend transition. Specifically, a bend transition occurs with these transition sources 6 as a starting point to expand in the radial directions, as shown in FIG. 7B. Referring to FIG. 7B, a bend transition has occurred in hatched regions 5, which expands with time, with the transfer source 6 as a center point.

It was observed, however, that a bend transition which expanded within the pixel region did not expand any further, as shown in FIG. 7C.

A bend transition ratio, which is a percentage of transfer of a bend transition to an adjacent pixel region, is defined as follows:

A bend transition ratio="observation points in which a bend transition is transferred to an adjacent pixel region/all the observation points"

Figure 8:
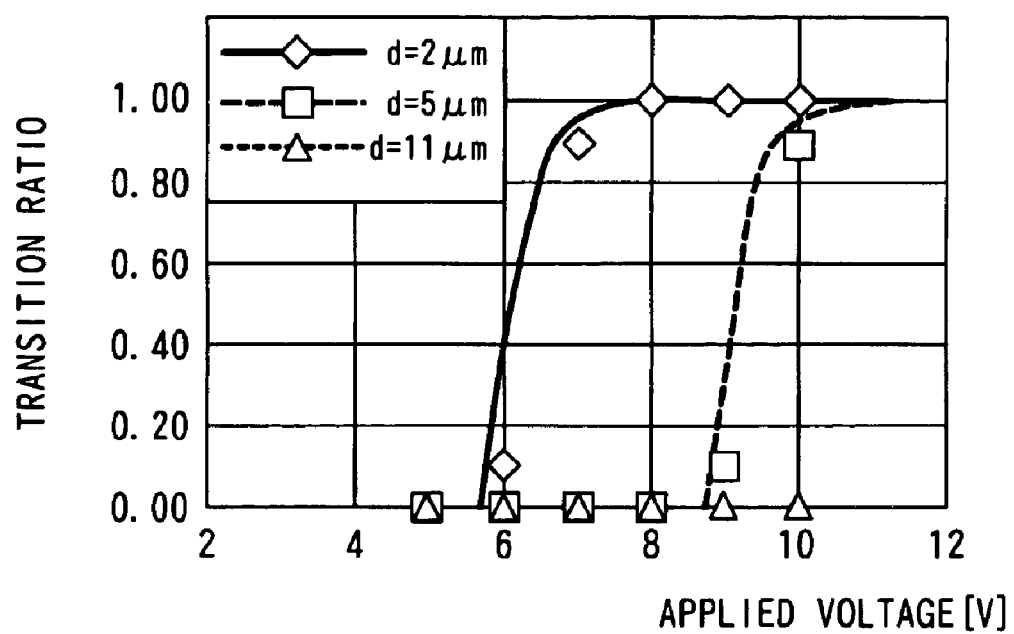
FIG. 8 is a graph depicting a relationship among an inter-pixel distance, an applied voltage, and a bend transition ratio.

FIG. 8 shows a change in the bend transition ratio with respect to a transition voltage when an interval d between pixel regions is set to 2 $\mu$m, 5 $\mu$m, and 11 $\mu$m, respectively. In FIG. 8 diamonds ($\diamond$), squares ($\square$), and triangles ($\Delta$) indicate respectively results when the interval d is 2 $\mu$m, 5 $\mu$m, and 11 $\mu$m.

Referring to FIG. 8, when the inter-pixel distance d is 2 $\mu$m, as indicated by diamonds, the transition ratio is 0 when an application voltage is under 5V. The transition ratio starts increasing when an applied voltages is increased to about 6V. With application of voltage of about BV, the transition ratio reaches 1, where transfer of a bend transition to an adjacent pixel region is secured.

Figure 9A:
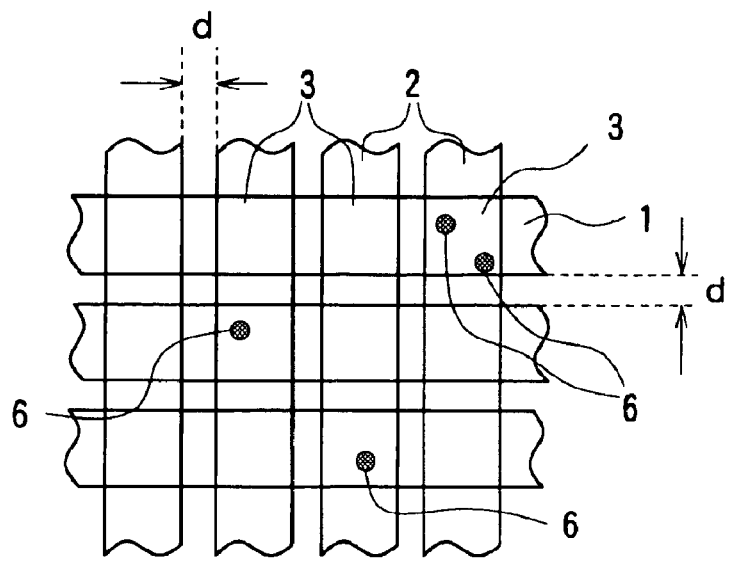
FIGS. 9A, 9B and 9C are plan views showing how a bend transition expands in a passive matrix type LCD in which an inter-pixel distance is less than a transition distance.
Figure 9B:
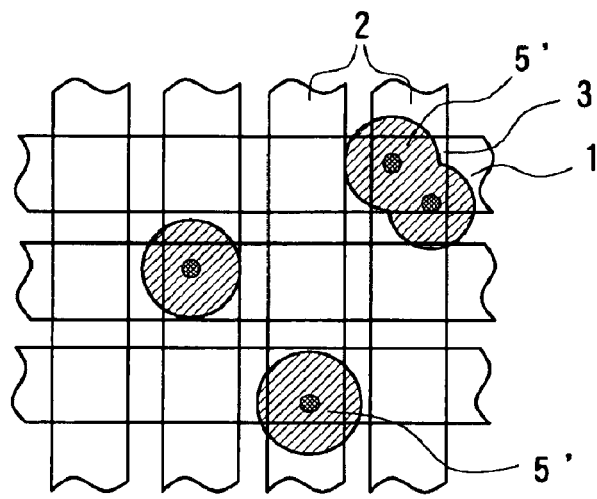
Figure 9C:
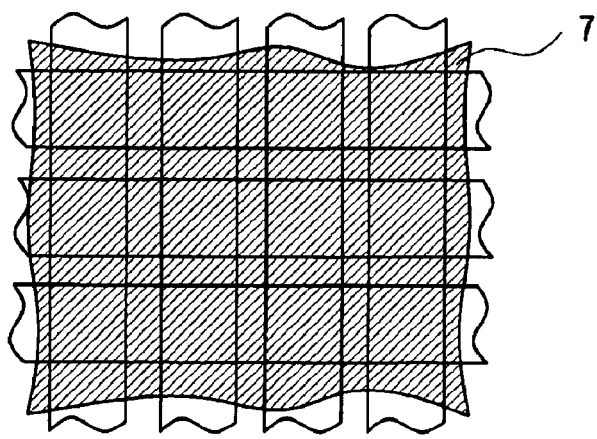

FIGS. 9A to 9C are plan views showing how a bend transition expands when the inter-pixel distance is 2 $\mu$m. The structure of the LCD in FIGS. 9A to 9C is similar to that shown in FIGS. 7A to 7C, except that the interval d between the pixel regions is 2 $\mu$m. FIG. 9A, which corresponds to FIG. 7A, shows random occurrence of the transition sources. Referring to FIG. 9B, the bend transition expands with the transfer source 6 as a center point, the bend transition region 5' expanding over to the adjacent pixel region 3. Referring further to FIG. 9C, the bend transition region 7 shown as a hatched region expands all over the cells. With a high bend transition ratio, the bend transition region can expand all over the surface as described, which secures high speed response uniformly all over the LCD surface.

Referring back to FIG. 8, when the interval d is 5 $\mu$m, as indicated by squares, the transition ratio remains 0 when an application voltage is 8V. The transition ratio starts increasing when an applied voltages is about 9V. With application of voltage of about 11, the transition ratio reaches 1. Compared to the case where the inter-pixel distance d is 2 $\mu$m, a higher transition voltage is required for increasing the transition ratio when the interval d is 5 $\mu$m. Further, when the interval d is 11 $\mu$m, as indicated by triangles, the transition ratio remains 0 even with application of voltage of 10V. Although it is expected that the transition ratio will increase with a higher voltage as in the cases of the interval of 2 μm and 5 μm, a pixel voltage to be applied to an LCD is generally about 10V or less. Therefore, the interval between the pixel regions should be 5 μm or less, preferably 2 μm or less. Hereinafter, the interval between pixels (interval between electrodes in this example) in which a bend transition can be obtained is referred to as a transition distance.

From the above observations, it is understood
that a bend transition is likely to transfer to an adjacent pixel region with a higher voltage applied between the electrodes,
that the interval region between electrodes forms a barrier which prohibits a bend transition,
that transfer of a bend transition between adjacent pixel regions occurs easily with a smaller interval between the electrodes, and
that the interval between the pixel regions should be equal to or less than a transition distance, namely 5 μm or less, preferably 2 μm or less.

Figure 10A:
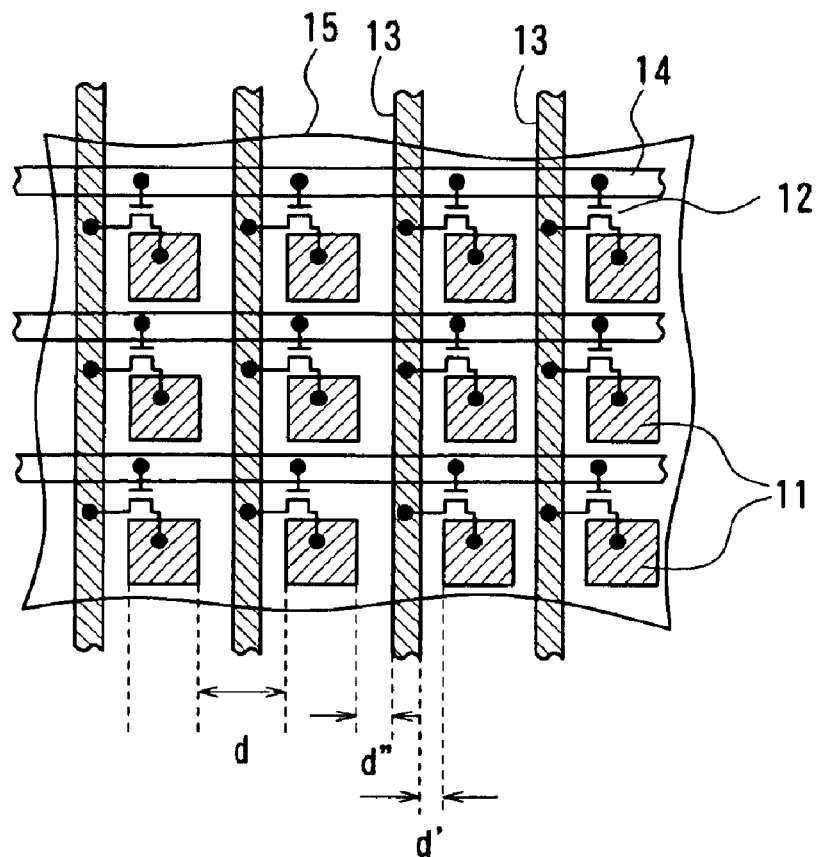
FIGS. 10A and 10B are a plan view and a cross section, respectively, of an active matrix type LCD.
Figure 10B:
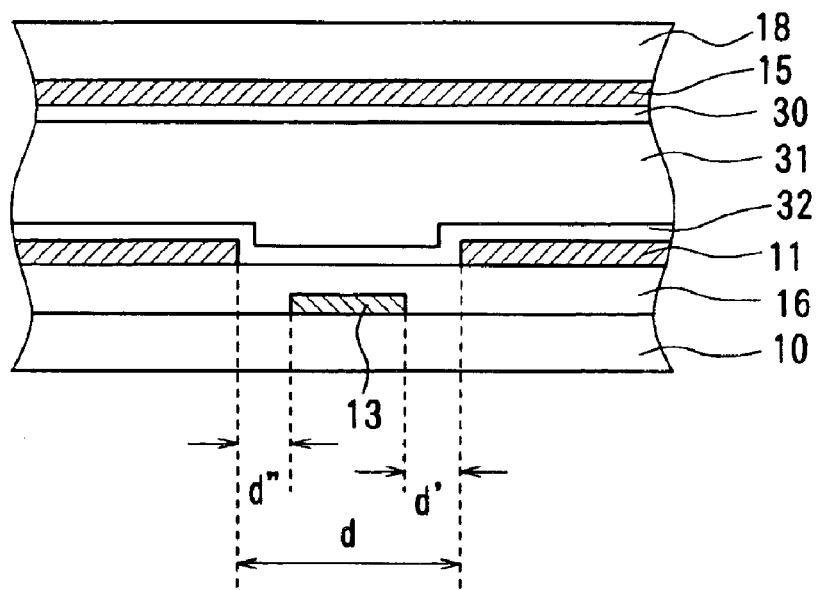
Figure 11A:
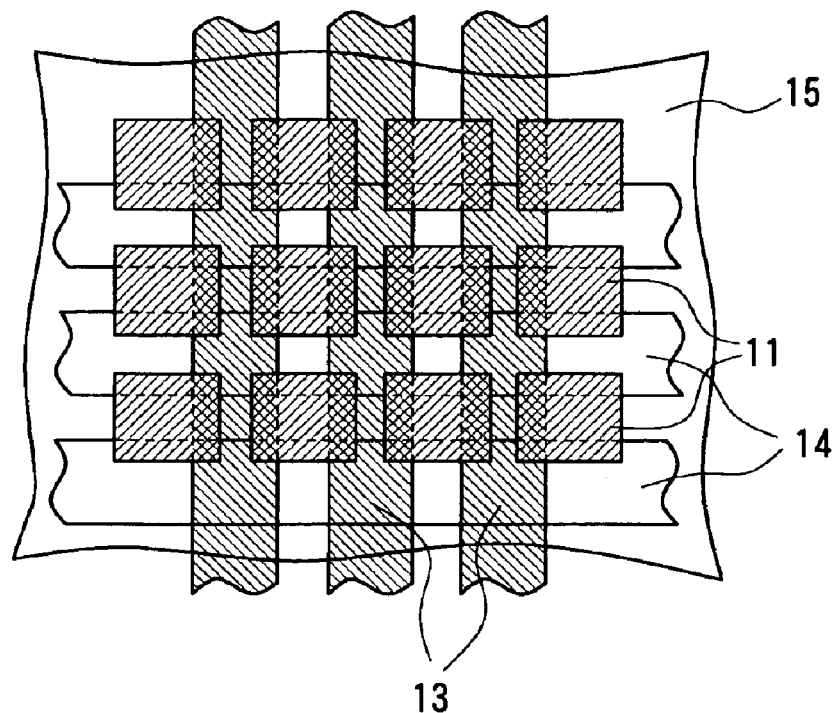
FIGS. 11A and 11B are a plan view and a cross section, respectively, of another active matrix type LCD.
Figure 11B:
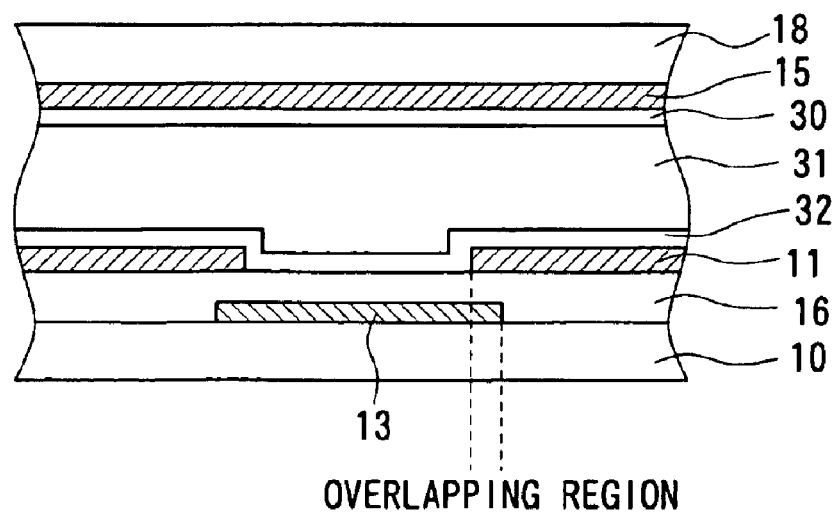

The above features are not limited to a passive matrix type LCD as shown in FIGS. 9A to 9C, but are similarly applicable to an active matrix type LCD. FIG. 10A is a plan view of an active matrix type LCD and FIG. 10B is a cross section showing a section of an interval between pixel electrodes 11 of the LCD. Referring to FIGS. 10A and 10B, on a first transparent substrate 10, a plurality of data lines 13 are formed, on which gate lines 14 are further formed via an insulating film (not shown). On the gate lines 14 are provided pixel electrodes 11 for each pixel via an insulating film 16 which is a planarization film, and an alignment film 32 formed thereon. On a second transparent substrate 18 disposed so as to face the first transparent substrate 10, a common electrode 15 opposing the plurality of pixel electrodes 11 and an alignment film 30 are formed in this order. Between the first and second substrates is disposed liquid crystal 31. An auxiliary capacitor electrode (not shown) is also connected to the pixel electrodes 11.

In an interval d between adjacent pixel electrodes 11, the data line 13 and the gate line 14 are disposed and also a withstanding voltage between the electrodes should be secured. Therefore, it is difficult to set this interval d to be equal to or less than a transition distance. When a transition voltage is applied only to the pixel electrodes 11 having an interval d which is greater than a transition distance, a bend transition may not be achieved in some pixels because of a barrier formed by a region between the pixel electrodes 11. Therefore, when applying a transition voltage on the side of the first substrate 10, it is preferable to apply a transition voltage to all the electrodes and lines formed on the first substrate including the pixel electrodes 11, the data lines 13, the gate lines 14, the auxiliary capacitor electrodes or the like. Application of a transition voltage to the data lines 13 and the gate lines 14 enables the liquid crystal between the pixel electrodes 11 to transition to a bend alignment. However, this will complicate lines for applying a transition voltage and also may cause breakdown of the thin film transistors due to application of a transition voltage to the gate electrodes.

Therefore, in an active matrix type LCD, it is preferable to apply a transition voltage to the common electrode 15. Application of a transition voltage to the common electrode 15 which covers all of the gate electrodes, the date lines 13 and the gate lines 14, while various electrodes on the first substrates being grounded, causes an electrical field to be generated not only between the pixel electrodes 11 and the common electrode 15, but also between the data and gate lines 13, 14 and the common electrode 15. Because such an electrical field is generated, expansion of a bend transition is not prevented, and a bend transition is thereby secured over the whole surface of the display screen.

As long as a transition voltage is applied to the common electrode 15, as described above, it is possible to set an interval d between the pixel electrodes 11 to be greater than a transition distance, with an interval d', d" between the pixel electrode 11 and the data line 13 or the gate line 14 being equal to or less than a transition distance.

Although it is difficult to set an interval d between the pixel electrodes 11 to be a transition distance, namely 2 μm or less, as described, it is easy to set an interval d' or d" between the pixel electrodes 11 and the data line 13 or the gate line 14 to be 2 μm or less because these lines are separated from the pixel electrodes 11 via the insulating film 16.

It is further preferable to form the pixel electrodes 11 so as to overlap with the data lines 13 and the gate lines 14, such that an interval d' and d" between the pixel electrode 11 and the date line 13 or the gate line 14 becomes 0.

Disposing each electrode as an inter-pixel electrode, such that inter-pixel regions where no electrodes exist do no extend over a distance which is greater than a transition distance, is important in the present embodiment. The electrodes disposed between pixels, namely inter-pixel electrodes, are not limited to the data lines 13 or the gate lines 14, and specific electrodes may be provided or the auxiliary capacitor electrodes may be used for them. In an active matrix type LCD, the date lines and gate lines are optimum inter-pixel electrodes because they are disposed all over the display region in a matrix shape.

According to the embodiment 2, a distance between the first electrodes in an OCB mode LCD is set to be 5 μm or less, preferably 2 μm or less, such that a bend alignment state can expand beyond the inter-pixel regions, thereby achieving high speed drive of the liquid crystal in each pixel in an OCB mode.

Provision of conductive layers such as the date lines 13 and the gate lines 14 enables a bend transition to be expanded over pixels, even when an interval between the pixel electrodes 11 is not 2 μm or less.

Embodiment 3

Figure 12A:
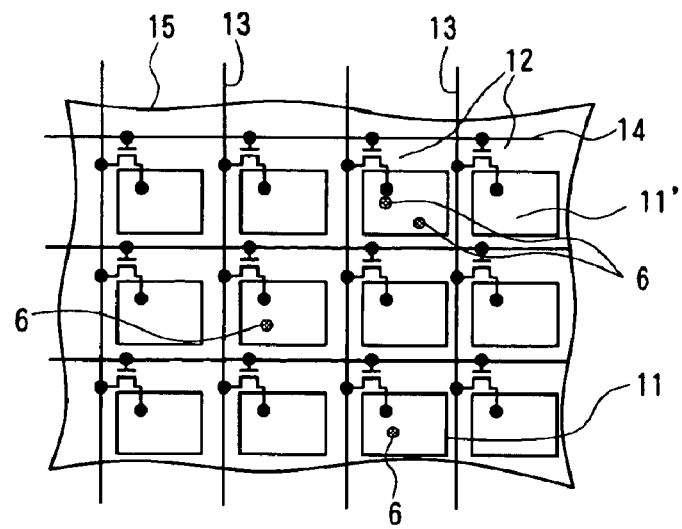
FIGS. 12A, 12B and 12C are plan views showing how a bend transition expands in a passive matrix type LCD.
Figure 12B:
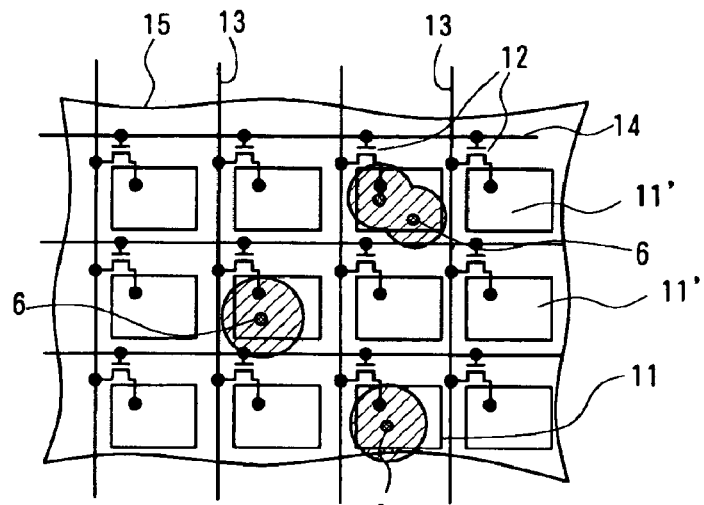
Figure 12C:
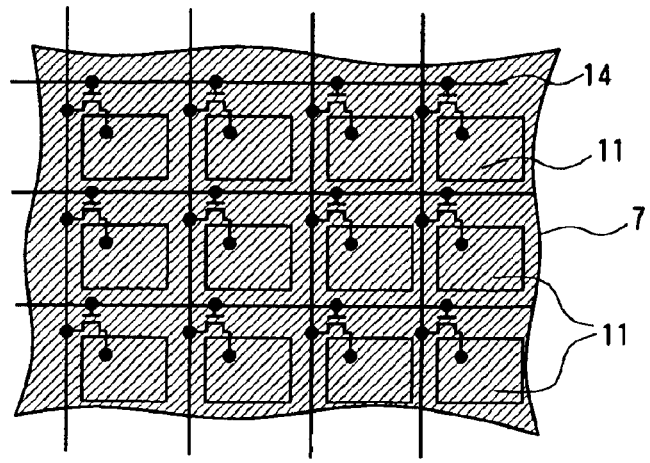

A relationship between a bend transition and a pretilt angle will now be described with reference to an active matrix type LCD as an example. FIGS. 12A to 12C are plan views of an active matrix type LCD showing a transition from a splay alignment to a bend alignment. The structure of the LCD shown in FIGS. 12A to 12C is similar to the above described structure shown in FIGS. 6A and 10A.

Referring to FIG. 12A, each of several points 6 in cells indicated by cross hatched lines is a transition factor (transition source) which triggers a bend transition. As in the passive matrix type LCD shown in FIGS. 9A to 9C, in an active matrix type LCD, a bend transition occurs with these transition sources 6 as starting points and expands in the radial directions, which is shown in FIG. 12B. Referring to FIG. 12B, a bend transition is performed in hatched regions 5 which enlarges with time with the transfer source 6 as a center point, to finally expand over the entire surface of the cells as shown in FIG. 12C, as long as inter-pixel regions having no electrodes formed thereon (d', d" or d) do not extend widely as already described.

In the transition mechanism as described above, a rapid bend transition can be achieved by increasing the number of transition sources generated and accelerating a transition expansion speed.

The transition sources occur at random, as already described, and therefore do not always occur at fixed points. When a bend transition does not transfer between adjacent pixels, liquid crystal on the pixel electrode 11' in which no transition sources 6 are generated does not transition to a bend alignment. A bend transition ratio can then be defined as follows:

A bend transiting ratio="number of electrodes in which a bend transition is achieved within 60 seconds after application of a transition voltage/ whole number of electrodes"

Figure 13:
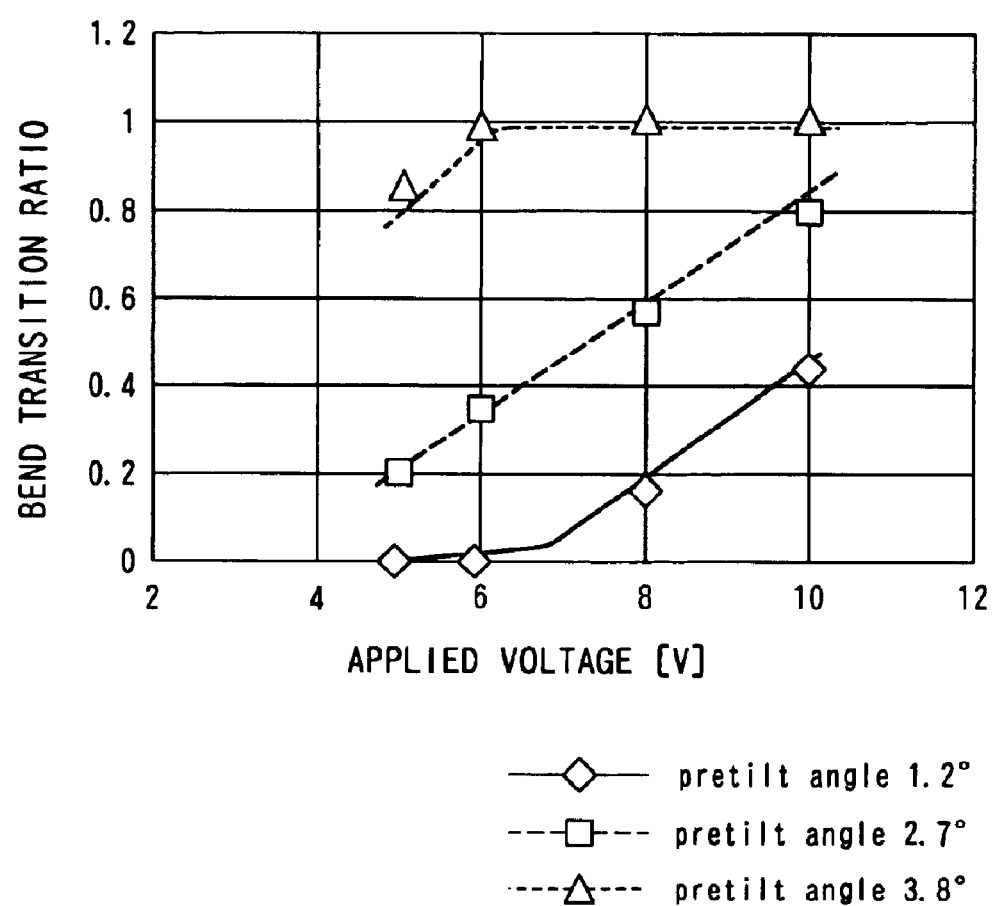
FIG. 13 is a graph showing a relationship between a pretilt angle and a bent transition ratio.

FIG. 13 depicts a change in a bend transition ratio for three samples with different pretilt angles, namely three types of LCDs each employing an alignment film having a different value set for the pretilt angle of liquid crystal, when transfer voltages of different values are applied. For application of the transfer voltage, the voltage of a square wave of 30 Hz was varied from 5V to 10V. The three samples include a sample 1 (indicated by ◇) with a pretilt angle of 1.2°, a sample 2 (indicated by □) with a pretilt angle of 2.7°, and a sample 3 (indicated by △) with a pretilt angle of 3.8°, respectively having 10×10 (x×y) electrodes each having a size of 5 mm×5 mm.

The results show that the larger the pretilt angle, the higher the bend transition ratio.

The transition ratio is not necessarily 100% because a bend transition transfers from an adjacent pixel. It is obvious that a higher transition ratio can provide a faster transition. As described above, a withstanding voltage between the first and second electrodes is not generally set to be very large due to the fine structure of an LCD. Further, application of a high voltage requires a corresponding large power source, which results in upsizing of a device when an LCD is used for a monitor of a portable terminal, for example. Therefore, the foregoing sample 1 with a pretilt angle of 1.2°, for which the bend transition ratio is less than 50% with application of a voltage of 10V, is not preferable. In an LCD with a bend alignment, the pretilt angle set by an alignment film should be 1.2° or more, and preferably as large as possible.

Figure 14A:
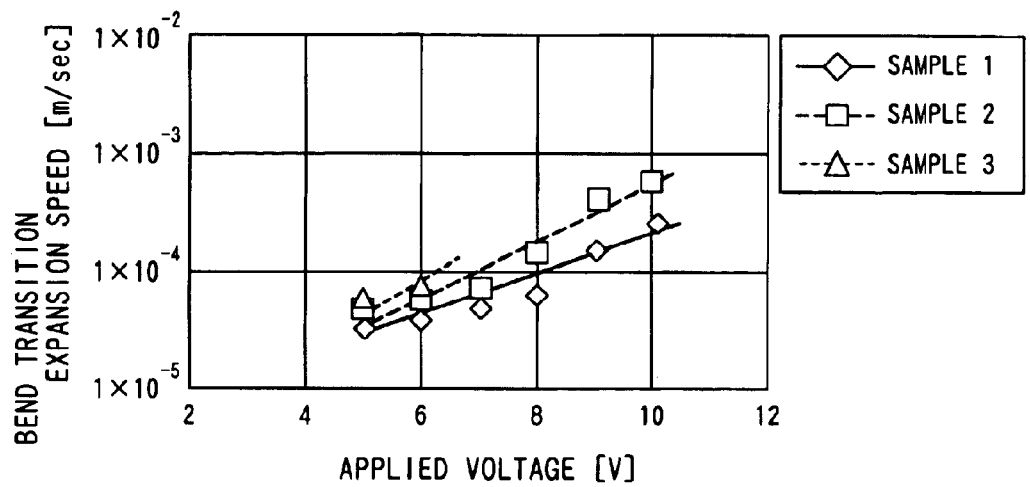
FIGS. 14A and 14B are graphs each showing a relationship between a pretilt angle and a bent transition expansion speed.
Figure 14B:
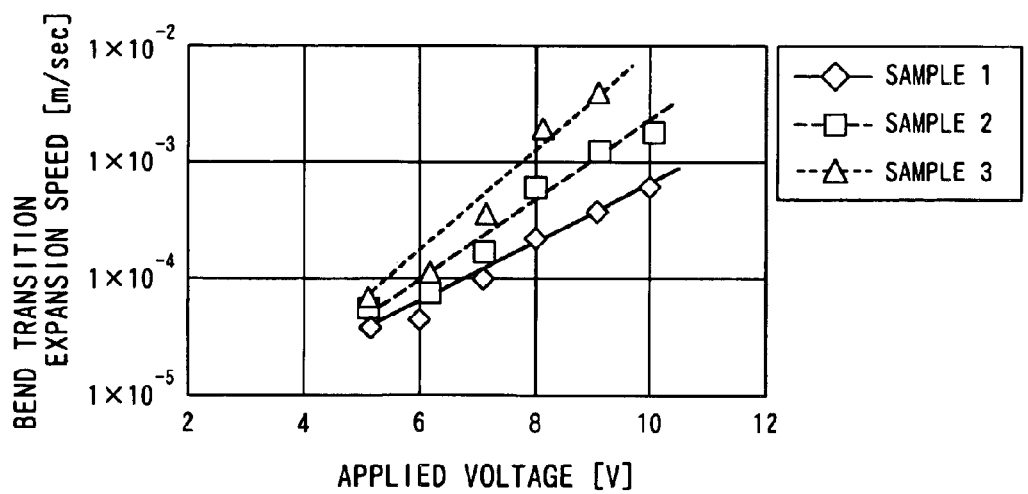

Now, a bend transition expansion speed is defined as follows:

Bend transition expansion speed=a distance over which a bend transition is performed/time required for transition A time required for a bend transition to expand from a transition source to a point 3 mm away from the source 6 was measured to obtain a bend transition expansion speed. The results are shown in FIGS. 14A and 14B, of which FIG. 14A shows a bend transition expansion speed after isotropic treatment while FIG. 14B shows a bend transition expansion speed in a case where another bend transition is caused immediately after a bend transition.

These results show that the bend transition expansion speed becomes faster as the transition voltage and the pretilt angle increase. Also, a bend transition expands faster in a case where liquid crystal once transitioned to a bend alignment reverts to a splay alignment, and transitions to a bend alignment again, than in a case where liquid crystal is subjected to an isotropic treatment to enter an initial state before transitioning to a bend alignment. This is observed because the state of a high pretilt angle obtained at an interface in a bend alignment state when an transition voltage is applied remains for a fixed time period, ranging from several to several tens of hours in the experiments. Also, liquid crystal, which remains undriven for a long period of time, retains a splay alignment state. When such liquid crystal with the splay alignment state transitions to a bend alignment, a bend transition expansion speed is lower than when liquid crystal which remains in a splay alignment on for a short time performs a bend transition. Therefore, when a bend transition is required in liquid crystal which has not been driven for a long period of time (when the power is off, for example), it is preferable to cause the liquid crystal to immediately transition to a bend alignment prior to application of a display voltage.

Figure 15:
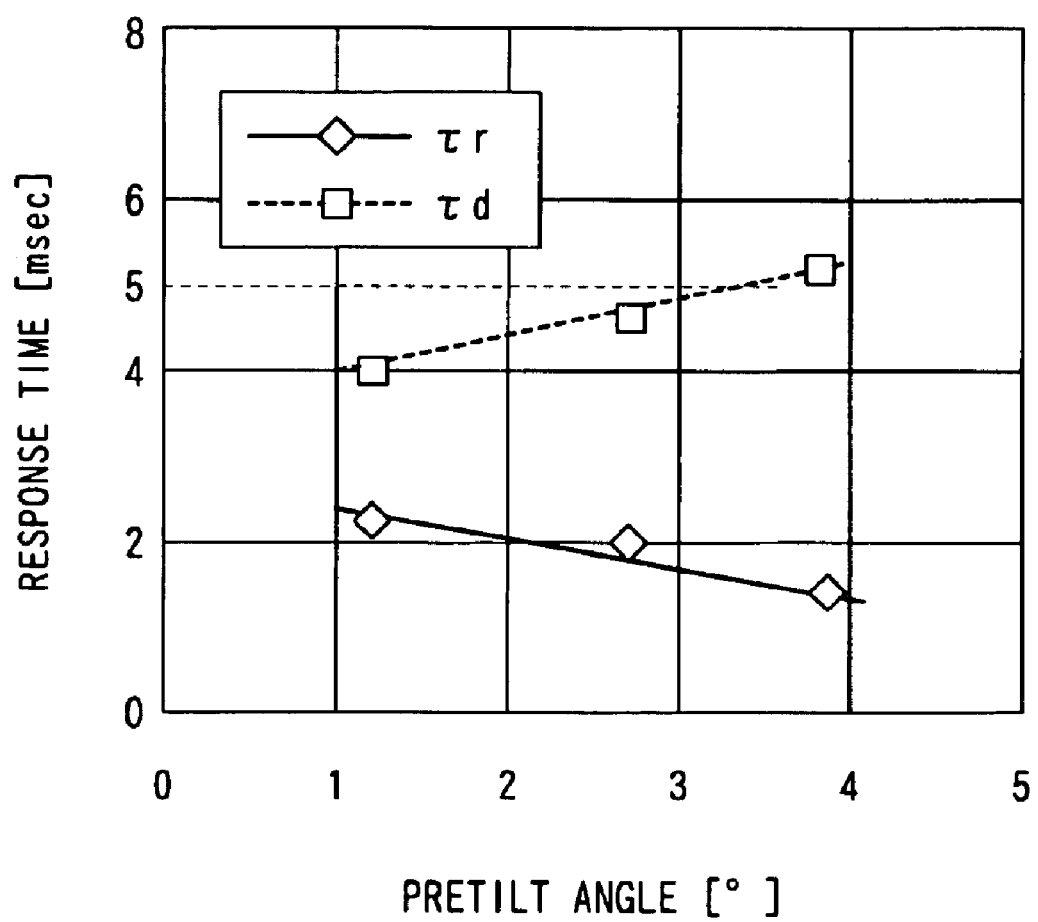
FIG. 15 is a graph showing a relationship between a pretilt angle and a response time in liquid crystal with a bend alignment.

When considering use of liquid crystal with a bend alignment for an LCD, it is very significant that a time required for liquid crystal to transition to an aligned state after application of a drive voltage, namely a response time, should be fast. It should be confirmed that the above mentioned transition time refers to a time required for a transition from a splay alignment state to a bend alignment state, whereas a response time which will be described hereinafter refers to a time required for liquid crystal to enter, from a fundamental state, into a drive state when a drive voltage is applied. FIG. 15 depicts a response time at 25° C. in each sample, in which a rising response time $\tau r$ is a time required until liquid crystal is in a drive state after application of a drive voltage thereto, and a falling response time $\tau d$ is a time required until the liquid crystal is reverted, from a drive state, to a fundamental state while removing a drive voltage from a drive voltage application state. The results in FIG. 15 show that a falling response time $\tau d$ is faster in an alignment film with a smaller pretilt angle, which may result from the fact that an alignment layer with a smaller pretilt angle has a larger anchoring effect.

In an FS-LCD which performs image display at a frame frequency of 60 Hz, a display time required for one color is $\frac{1}{180}$sec.=5.6 ms. Provided that a scanning time of 0.6 ms is required, a response time should be 5 ms or less. Referring to FIG. 15, in order to obtain a falling response time $\tau d$ of 5 ms or less, the pretilt angle should be 3° or less.

The foregoing example which was described using an active matrix type LCD is similarly applicable to a passive matrix type or any other types of LCDs.

According to this embodiment, the pretilt angle set by an alignment film is 1.2° or more in an OCB mode LCD, such that a bend transfer in liquid crystal can be secured and a sufficiently fast expansion speed for a bend transition can be obtained to thereby shorten a time for applying a transition voltage.

Further, the pretilt angle is set to be 3° or less, such that not only the rising response time for liquid crystal after bend transition, but also the falling response time thereof can be practically effective.

While the preferred embodiments of the present invention have been described using specific terms, such description is for illustrative purposes only, and it is to be understood that changes and variations may be made without departing from the spirit or scope of the appended claims.

What is claimed is:

1. A method of driving a liquid crystal display device including a first electrode formed on a side of a first substrate;

a first alignment film formed to cover said first electrode;

a second electrode formed on a side of a second substrate facing said first substrate;

a second alignment film formed to cover said second electrode;

a liquid crystal provided between said first and second alignment films to have a splay alignment state and a bend alignment state;

the method comprising applying a transition voltage higher than a threshold voltage and a maximum in a range for a display voltage to said liquid crystal through said first and second electrodes, so that said liquid crystal achieves a transition to said bend alignment state, said transition voltage is applied before said display voltage, said display voltage being lower than said transition voltage and higher than said threshold voltage.

2. The method of driving a liquid crystal display device according to claim 1, wherein the splay alignment state energy level crosses the bend alignment state energy level when a voltage applied between the first and second electrodes reaches a prescribed threshold voltage.

3. The method of driving a liquid crystal display device according to claim 1, wherein the state energy level of said liquid crystal in said bend alignment state becomes lower than that of said liquid crystal in said splay alignment state when the voltage applied to said liquid crystal through the first and second electrodes reaches or exceeds a prescribed threshold voltage.

4. The method of driving a liquid crystal display device according to claim 1, wherein
said first electrode is composed of a plurality of pixel electrodes formed corresponding to a plurality of pixels disposed,
said second electrode is formed as a common electrode facing said plurality of pixel electrodes, and
said transition voltage is applied to said liquid crystal by making a potential difference between said first substrate and said common electrode greater than a potential difference between said first substrate and said plurality of pixel electrodes.

5. The method of driving a liquid crystal display device according to claim 1, wherein rubbing treatment is performed on said first and second alignment films in substantially the same direction.

6. The liquid crystal display device according to claim 1, wherein the LCD device is a computer monitor, and at least a certain period in activation of the computer is set as a transition period of the liquid crystal due to the transition voltage application.

7. The liquid crystal display device according to claim 1, wherein the transition voltage is less than 20 V, and that a transition period of the liquid crystal lasts one second or more.

8. A method of driving a liquid crystal display device comprising:
a first electrode formed on a side of a first substrate;
a first alignment film formed to cover said first electrode;
a second electrode formed on a side of a second substrate facing said first substrate;
a second alignment film formed to cover said second electrode; and
a liquid crystal provided between said first and second alignment films to have a splay alignment state and a bend alignment state; the method comprising:
initially applying a transition voltage higher than a threshold voltage to said liquid crystal through said first and second electrodes, said transition voltage being higher than a maximum in a range for said display voltage, so that said liquid crystal achieves a transition to said bend alignment state, to thereby drive the liquid crystal in the bend alignment state and present a display; and
later applying a display voltage between said first and second electrodes to drive said liquid crystal, and present a display in accordance with said display voltage, said display voltage being lower than said transition voltage and higher than said threshold voltage.

9. The method of driving a liquid crystal display device according to claim 8, wherein the state energy level of said liquid crystal in said bend alignment state becomes lower than that of said liquid crystal in said splay alignment state when the voltage applied to said liquid crystal though said first and second electrodes reaches or exceeds a prescribed threshold voltage.

10. The method of driving a liquid crystal display device according to claim 7, wherein said display voltage is higher than said threshold voltage.

11. The method of driving a liquid crystal display device according to claim 8, wherein
the state energy level of said liquid crystal in said bend alignment state becomes lower than that of said liquid crystal in said splay alignment state when the voltage applied to said liquid crystal through said first and second electrodes reaches or exceeds a prescribed threshold voltage, and
said transition voltage is continuously applied between said first and second electrodes during a prescribed transition period determined in accordance with the value of said transition voltage.

12. The method of driving a liquid crystal display device according to claim 11, wherein said display voltage is higher than said threshold voltage.

13. The method of driving a liquid crystal display device according to claim 8, wherein
said first electrode is composed of a plurality of pixel electrodes formed corresponding to a plurality of pixels disposed,
said second electrode is formed, as a common electrode facing said plurality of pixel electrodes, and
said transition voltage is applied to said liquid crystal by making a potential difference between said first substrate and said common electrode greater than a potential difference between said first substrate and said plurality of pixel electrodes.

14. The method of driving a liquid crystal display device according to claim 13, wherein said display voltage is higher than said threshold voltage.

15. A liquid crystal display device including liquid crystal between first and second substrates, comprising:
a plurality of first electrodes formed on a side of said first substrate facing said second substrate;
a first alignment film formed to cover said plurality of first electrodes;
a second electrode formed on a side of said second substrate facing said first substrate; and
a second alignment film formed to cover said second electrode; wherein
said liquid crystal is provided between said first and second alignment films, and has a splay alignment state and a bend alignment state, and
the interval between adjacent electrodes among said plurality of first electrodes, or the width of a region where a conductive layer is not present located between adjacent electrodes among said plurality of first electrodes, is 5 $\mu$m or less, and
a transition voltage higher than a maximum in a range for a display voltage is applied to said liquid crystal through the first and second electrodes, the transition voltage being higher than a threshold voltage, so that the liquid crystal achieves a transition to the bend alignment state to thereby drive the liquid crystal in the bend alignment state and present a display.

16. The liquid crystal display device according to claim 15, wherein the interval between adjacent electrodes among said plurality of first electrodes, or the width of a region where a conductive layer is not present located between adjacent electrodes among said plurality of first electrodes, is 2 µm or less.

17. The liquid crystal display device according to claim 15, wherein rubbing treatment is performed on said first and second alignment films in substantially the same direction.

18. A liquid crystal display device including liquid crystal between first and second substrates, comprising:
 a plurality of first type electrodes disposed on a side of said first substrate facing said second substrate;
 a first alignment film formed to cover said plurality of first stripe-type electrodes;
 a plurality of second stripe-type electrodes disposed on a side of said second substrate facing said fit substrate in a direction substantially perpendicular to sad plurality of first electrodes; and
 a second alignment film formed to cover said plurality of second stripe-type electrodes; wherein
 said liquid crystal is provided between said first and second alignment films, and has a splay alignment state and a bend alignment state, and
 either or both of the interval between adjacent electrodes among said plurality of first stripe-type electrodes and the interval between adjacent electrodes among said plurality of second stripe-type electrodes, is 5 µm or less, and
 a transition voltage higher than a maximum in a range for a display voltage is applied to said liquid crystal through said plurality of first stripe type electrodes and said plurality of second stripe-type electrodes, the transition voltage being higher than a threshold voltage, so that the liquid crystal achieves a transition to the bend alignment state to thereby drive the liquid crystal in the bend alignment state and present a display.

19. The liquid crystal display device according to claim 18, wherein either or both of the interval between adjacent electrodes among said plurality of first strip-type electrodes and the interval between adjacent electrodes among said plurality of second stripe-type electrodes, is 2 µm or less.

20. The liquid crystal display device according to claim 18, wherein rubbing treatment is performed on said first and second alignment films in substantially the same direction.

21. A liquid crystal display device including liquid crystal between first and second substrates, comprising:
 a plurality of pixel electrodes formed on a side of said first substrate facing said second substrate;
 a fist alignment film formed to cover said plurality of pixel electrodes;
 a common electrode formed on a side of said second substrate facing said first substrate; and
 a second alignment film formed to cover said common electrode; wherein
 said liquid crystal is provided between said first and second alignment films, and has a splay alignment state and a bend alignment state, and
 the interval between adjacent electrodes among said plurality of pixel electrodes, or the width of a region where a conductive layer is not present located between adjacent electrodes among said plurality of pixel electrodes, is 5 µm or less, and
 a transition voltage higher than a maximum in a range for a display voltage is applied to said liquid crystal through said plurality of pixel electrodes and said common electrode, the transition voltage being higher than a threshold voltage, so that the liquid crystal achieves a transition to the bend alignment state to thereby drive the liquid crystal in the bend alignment state and present a display.

22. The liquid crystal display device according to claim 21, wherein the width of a region where a conductive layer is not present located between adjacent electrodes among said plurality of pixel electrodes is 2 µm or less.

23. The liquid crystal display device according to claim 21, further comprising an inter-pixel electrode disposed at the interval between adjacent electrodes among said plurality of pixel electrodes, wherein the distance between said inter-pixel electrode and the corresponding electrode among said plurality of pixel electrodes is 2 µm or less.

24. The liquid crystal display device according to claim 23, wherein said plurality of pixel electrodes are insulated from said inter-pixel electrode.

25. The liquid crystal display device according to claim 24, further comprising an inter-pixel electrode disposed at the interval between adjacent electrodes of said plurality of pixel electrodes, wherein said inter-pixel electrode and the corresponding electrode among said plurality of pixel electrodes have an overlapping region with an insulating layer interposed therebetween.

26. The liquid crystal display device according to claim 21, wherein
 a switching element is connected to each of said plurality of pixel electrodes and
 a selection line for selecting said switching element or a sigal line for supplying a prescribed signal to each of said plurality of pixel electrodes is provided as an inter-pixel electrode at the interval between adjacent electrodes among said plurality of pixel electrodes.

27. The liquid crystal display device according to claim 26, wherein said selection line or said signal line and the corresponding electrode among said plurality of pixel electrodes have an overlapping region with an insulating layer interposed there between.

28. The liquid crystal display device according to claim 21, wherein rubbing treatment is performed on said first and second alignment films in substantially the same direction.

29. A liquid crystal display device including liquid crystal between first and second substrates, comprising:
 a plurality of pixel electrodes formed on a side of said first substrate facing said second substrate;
 a first alignment film formed to cover said plurality of pixel electrodes;
 a common electrode formed on a side of said second substrate facing said first substrate; and
 a second alignment film formed to cover said common electrode; wherein said liquid crystal is provided between said first and second alignment films, and has a splay alignment state and a bend alignment state, and
 the interval between adjacent electrodes among said plurality of pixel electrodes, or the width of a region where a conductive layer is not preset located between adjacent electrodes among said plurality of pixel electrodes, is 5 µm or less,
 wherein a transition voltage higher than a maximum value of a display voltage is applied to said liquid crystal through said plurality of pixel electrodes and said common electrode, so that said liquid crystal achieves a transition to said bend alignment state, to thereby drive said liquid crystal in said bend alignment state and present a display, wherein said transition voltage is applied to said liquid crystal by making a potential difference between said first substrate and said common electrode greater than a potential difference between said first substrate and said plurality of pixel electrodes.

30. A liquid crystal display device including liquid crystal between first and second substrates, comprising:

a first electrode film formed to cover said first electrode;

a second electrode formed on a side of said second substrate facing said first substrate; and a second alignment film formed to cover said second electrode; wherein said liquid crystal is provided between said first and second alignment films, and has a splay alignment state and a bend alignment state, and a pretilt angle determined by said first and second alignment films is greater than 1.2°, but not greater than 3.0°, and a transition voltage higher than a maximum in a range for a display voltage is applied to said liquid crystal through the first and second electrodes, the transition voltage being higher than a threshold voltage, so that the liquid crystal achieves a transition to the bend alignment state to thereby drive the liquid crystal in the bend alignment state and present a display, wherein said transition voltage is applied before said display voltage.

31. A liquid crystal display device including liquid crystal between first and second substrates, comprising:

a first electrode film formed to cover said first electrode;

a second electrode formed on a side of said second substrate facing said first substrate; and a second alignment film formed to cover said second electrode; wherein said liquid crystal is provided between said first and second alignment films, and has a splay alignment state and a bend alignment state, and a pretilt angle determined by said first and second alignment films is 3.0° or less, and a transition voltage higher than a maximum in a range for a display voltage is applied to said liquid crystal through the first and second electrodes, the transition voltage being higher than a threshold voltage, so that the liquid crystal achieves a transition to the bend alignment state to thereby drive the liquid crystal in the bend alignment state and present a display, wherein said transition voltage is applied before said display voltage.

32. A liquid crystal display device including liquid crystal between first and second substrates, said liquid crystal display device comprising a first electrode formed on a side of a first substrate facing said second substrate;

a first alignment film formed to cover said first electrode;

a second electrode formed on a side of a second substrate facing said first substrate; and a second alignment film formed to cover said second electrode; wherein said liquid crystal is provided between said first and second alignment films and has a splay alignment state and a bend alignment state, a transition voltage higher than a threshold voltage is applied to said liquid crystal through said first and second electrodes, said transition voltage being higher than a maximum in a range for a display voltage, so that said liquid crystal achieves a transition to said bend alignment state, to thereby drive the liquid crystal in the bend alignment state and present a display.

33. A liquid crystal display device including liquid crystal between first and second substrates, said liquid crystal display device comprising:

a first electrode formed on a side of a first substrate;

a first alignment film formed to cover said first electrode;

a second electrode formed on a side of a second substrate facing said first substrate;

a second alignment film formed to cover said second electrode; and said liquid crystal provided between said first and second alignment films to have a splay alignment state and a bend alignment state; wherein a display voltage is applied between said first and second electrodes to drive said liquid crystal, and present a display in accordance with said display voltage, and a transition voltage higher than a threshold voltage is applied to said liquid crystal through said first and second electrodes, said transition voltage being higher than a maximum in a range for a display voltage, so that said liquid crystal achieves a transition to said bend alignment state, to thereby drive the liquid crystal in the bend alignment state and present a display.

34. A liquid crystal display device including liquid crystal between first and second substrates, comprising:

a plurality of pixel electrodes formed on a side of said first substrate facing said second substrate;

a first alignment film formed to cover said plurality of pixel electrodes;

a common electrode formed on a side of said second substrate facing said first substrate; and a second alignment film formed to cover said common electrode; wherein said liquid crystal is provided between said first and second alignment films, and has a splay alignment state and a bend alignment state, and an inter-pixel electrode is disposed at an interval between said plurality of pixel electrode, a distance between a corresponding electrode among said plurality of pixel electrodes and said inter-pixel electrode is 5 µm or less, and said plurality of pixel electrodes and said inter-pixel electrode have a prescribed identical potential, and a transition voltage is applied to between said common electrode, and said pixel electrodes and said inter-pixel electrode, so that said liquid crystal achieves a transition to said bend alignment state.

35. The liquid crystal display device according to claim 34, wherein the distance between the corresponding electrode among said plurality of pixel electrodes and said inter-pixel electrode is 2 µM or less.

36. The liquid crystal display device according to claim 34, wherein said plurality of pixel electrodes is insulated from said inter-pixel electrode.

37. The liquid crystal display device according to claim 34, wherein the corresponding electrode among said plurality of pixel electrodes and said inter-pixel electrode have an overlapping region with an insulating layer interposed there between.

38. The liquid crystal display device according to claim 34, wherein a switching element is connected to each of said plurality of pixel electrodes, and at least one of a selection line for selecting said switching element and a signal line for supplying a prescribed signal to each of said plurality of pixel electrodes is provided as said inter-pixel electrode.

39. The liquid crystal display device according to claim 34, wherein said plurality of pixel electrodes and said inter-pixel electrode are grounded when said transition voltage is applied.

40. A liquid crystal display device including liquid crystal between first and second substrates, comprising:

a plurality of pixel electrodes formed on a side of said first substrate facing said second substrate;

a first alignment film formed to cover said plurality of pixel electrodes;

a common electrode formed on a side of said second substrate facing said first substrate; and a second alignment film formed to cover said common electrode; wherein said liquid crystal is provided between said first and second alignment films, and has a splay alignment state and a bend alignment state, and an inter-pixel electrode is disposed at an interval between said plurality of pixel electrodes, a distance between a corresponding electrode among said plurality of pixel electrodes and said inter-pixel electrode is 5 $\mu$m or less, and a transition voltage higher than a maximum in a range for a display voltage is applied to between said common electrode, and said pixel electrodes and said inter-pixel electrode, the transition voltage being higher than a threshold voltage, so that said liquid crystal achieves a transition to said bend alignment state.

41. The liquid crystal display device according to claim 40, wherein the distance between the corresponding electrode among said plurality of pixel electrodes and said inter-pixel electrode is 2 $\mu$m or less.

42. The liquid crystal display device according to claim 40, wherein said plurality of pixel electrodes is insulated firm said inter-pixel electrode.

43. The liquid crystal display device according to claim 40, wherein the corresponding electrode among said plurality of pixel electrodes and said inter-pixel electrode have an overlapping region with an insulating layer interposed therebetween.

44. The liquid crystal display device according to claim 40, wherein a switching element is connected to each of said plurality of pixel electrodes, and at least one of a selection line for selecting said switching element and a signal line for supplying a prescribed signal to each of said plurality of pixel electrodes is provided as said inter-pixel electrode.

* * * * *